US012734711B2

(12) United States Patent
Smith et al.

(10) Patent No.: US 12,734,711 B2
(45) Date of Patent: Sep. 15, 2026

(54) ELECTROSTATICALLY-ENHANCED FRICTION-GRIPPING END EFFECTOR

(71) Applicants: Diablo Capital, Inc., Pleasanton, CA (US); Kawasaki Robotics (USA) Inc., Wixom, MI (US)

(72) Inventors: Eryn Smith, Danville, CA (US); Charles Maschal, Pleasanton, CA (US); Avish Bharwani, Santa Clara, CA (US)

(73) Assignees: Diablo Capital, Inc., CA (US); Kawasaki Robotics (USA) Inc., MI (US)

( * ) Notice: Subject to any disclaimer, the term of this patent is extended or adjusted under 35 U.S.C. 154(b) by 463 days.

(21) Appl. No.: 18/415,395

(22) Filed: Jan. 17, 2024

(65) Prior Publication Data

US 2024/0269867 A1 Aug. 15, 2024

Related U.S. Application Data

(60) Provisional application No. 63/444,787, filed on Feb. 10, 2023.

(51) Int. Cl.
*B25J 15/00* (2006.01)

(52) U.S. Cl.
CPC ................................ *B25J 15/0085* (2013.01)

(58) Field of Classification Search
None
See application file for complete search history.

(56) References Cited

U.S. PATENT DOCUMENTS

| | | | | |
|---|---|---|---|---|
| 6,183,026 | B1 * | 2/2001 | Cai | H10P 72/78 294/213 |
| 6,275,748 | B1 * | 8/2001 | Bacchi | H10P 72/7602 700/250 |
| 9,966,294 | B2 * | 5/2018 | Smith | H10P 50/242 |
| 9,984,913 | B2 * | 5/2018 | Smith | H02N 13/00 |
| 10,236,202 | B2 * | 3/2019 | Smith | H10P 72/0428 |
| 2005/0110287 | A1 * | 5/2005 | Florindi | H10P 72/7602 294/2 |
| 2008/0213076 | A1 * | 9/2008 | Hanson | H10P 72/7602 414/744.1 |
| 2015/0287626 | A1 * | 10/2015 | Arai | H10P 72/3302 294/213 |
| 2021/0202291 | A1 * | 7/2021 | Yoshida | B25J 15/0683 |
| 2024/0120227 | A1 * | 4/2024 | Tan | B25J 11/0095 |

FOREIGN PATENT DOCUMENTS

| | | | |
|---|---|---|---|
| CN | 117622874 | * | 3/2024 |

* cited by examiner

*Primary Examiner* — William A. Rivera

(57) ABSTRACT

An electrostatically-enhanced friction-gripping end effector is an apparatus that quickly and securely moves a semiconductor wafer from one spot to another spot. The apparatus includes a flat effector body, an electrostatic antenna, an antenna controller, and a plurality of gripping pads. The flat effector body is the main weight-bearing structure that is used to support the semiconductor wafer and acts as a base for the other components to be connected together. The electrostatic antenna generates a non-uniform electrostatic field that applies an attractive force onto the semiconductive wafer, while the plurality of gripping pads frictionally grips the semiconductive wafer. The antenna controller provides instructions to turn on, turn off, or modulate the non-uniform electrostatic field.

16 Claims, 5 Drawing Sheets

ELECTROSTATICALLY-ENHANCED FRICTION-GRIPPING END EFFECTOR

The current application claims a priority to the U.S. provisional patent application Ser. No. 63/444,787 filed on Feb. 10, 2023.

FIELD OF THE INVENTION

The present invention generally relates to a robotic end effector for handling semiconductor workpieces. More particularly, the present invention relates to an electrostatically enhanced friction gripping end effector (hereto forward ESEE) that provides no contact with the electrostatic antenna and minimal contact to the contact pads that supports and the backside of the wafer.

BACKGROUND OF THE INVENTION

Conventional robotic vacuum chuck end effectors transfer significant particulate contamination to the backside of the wafer at areas where the chuck contacts the backside of the wafer.

Edge support or edge grip end effectors can help minimize the amount of particulate contamination transferred to the backside of the wafer. Edge grip end effectors, however, present difficulties in accurate wafer pick up and transfer. Edge also adds complication in actuators and wafer stops needed to be implemented on the end effector. This causes the end effector thickness to be increased and causes problems in cassettes and slit valves both issues are understood to those familiar in the art.

Accordingly, the modern solution has been to rely solely on friction as a means to reliably reduce contamination by having only limited direct contact with the wafer backside on pads that have a low shore hardness number, these materials must be semiconductor fabrication equipment compliant (i.e., chemically inert, non-shedding, high temperature). The speed is limited that the robot can maneuver with the wafer only relying on the static friction:

$$F_s = \mu_s F_n$$

If $F_n$ (force normal Newtonian)=mass of wafer (kg)*gravity (m/s/s) and static friction coefficient $\mu_s$ is fixed by the contact pad properties and asperity of the wafer backside, then the robot can only maneuver in the region below $F_s$ as to not cause the wafer to come off the end effector during operation. This limits the speed the robot can transfer wafers in the process tool thereby defining the wafer throughput of the process tool. With the cost of process tools being very high, a higher wafer throughput is desirable as to lower the cost of ownership by making the tool more productive. We have developed a novel solution to drastically increase throughput while adding no additional contamination, and no additional pickup or drop off time.

DETAILED DESCRIPTION OF THE INVENTION

All illustrations of the drawings are for the purpose of describing selected versions of the present invention and are not intended to limit the scope of the present invention.

Figure 1:
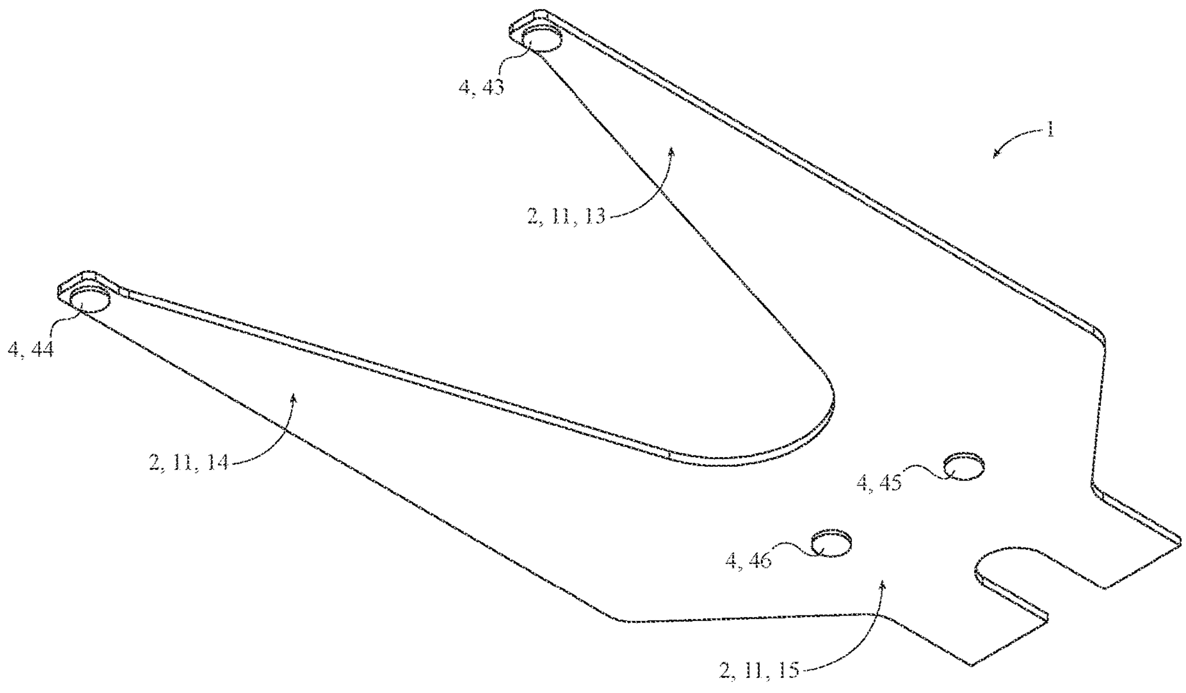
FIG. 1 is a front-left-bottom perspective view of the present invention.
Figure 2:
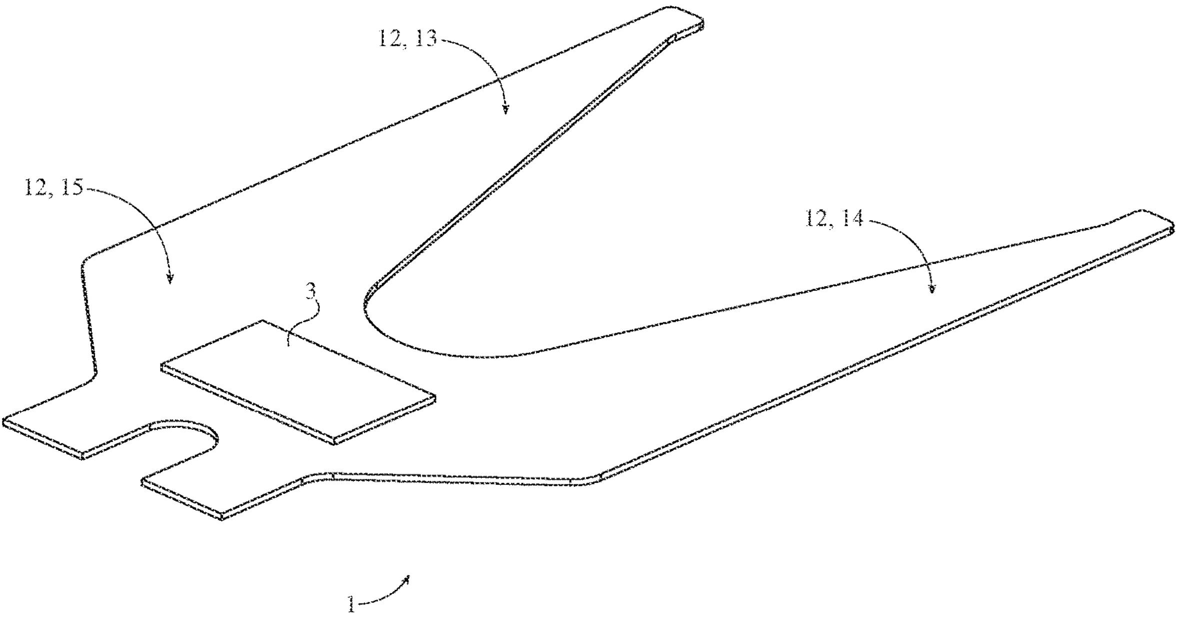
FIG. 2 is a rear-right-top perspective view of the present invention.
Figure 3:
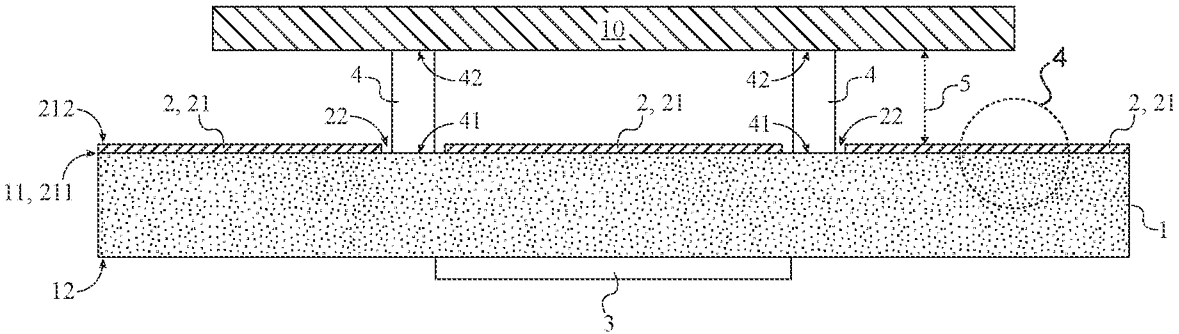
FIG. 3 is a schematic cross-sectional view of the present invention.

The present invention is an electrostatically-enhanced friction-gripping end effector, which is used to quickly and securely move a semiconductor wafer from one spot to another spot. The present invention is typically used with a pick-and-place robot arm. As can be seen in FIGS. 1-3, the present invention comprises a flat effector body 1, an electrostatic antenna 2, an antenna controller 3, and a plurality of gripping pads 4. The flat effector body 1 is the main structural body of the present invention that is used to carry a semiconductor wafer from one spot to another spot and allows the other components of the present invention to be connected together. The plurality of gripping pads 4 allows the present invention to frictionally grip a semiconductive wafer 10. Each of the plurality of gripping pads 4 is preferably made of a conductive elastomer and is preferably made of a material safe from electrostatic discharge. In addition, the flat effector body 1 and each of the plurality of gripping pads 4 are preferably at ground potential in order to prevent any electrostatic discharge. The electrostatic antenna 2 is used to generate a non-uniform electrostatic field that applies an attractive force onto a semiconductive wafer 10, which pulls the semiconductive wafer 10 closer to the flat effector body 1 and consequently increases the amount of friction applied onto the semiconductive wafer 10 by the plurality of gripping pads 4. The antenna controller 3 is used to selectively turn on or off the non-uniform electrostatic field.

The general configuration of the aforementioned components allows the present invention to effectively and efficiently grip a semiconductive wafer with an end effector as the semiconductive wafer is quickly and securely moved by the end effector. As can be seen in FIGS. 1-3, the flat effector body 1 comprises a proximal effector face 11 and a distal effector face 12, which are opposing faces of the flat effector body 1. While the end effector is gripping a semiconductive wafer 10, the proximal effector face 11 is located closer to the semiconductive wafer 10, and the distal effector face 12 is located farther away from the semiconductive wafer 10. The plurality of gripping pads 4 is distributed across the flat effector body 1 and is mounted onto the proximal effector face 11, which allows the plurality of gripping pads 4 to apply an even amount of grip across the entirety of a semiconductive wafer 10. In addition, the electrostatic antenna 2 comprises a thin antenna body 21 and a plurality of through holes 22. The thin antenna body 21 is a thin piece of conductive material that generates the non-uniform electrostatic field for the electrostatic antenna 2. The thin antenna body 21 is superimposed onto the proximal effector face 11 so that a semiconductive wafer 10 can be electrostatically attracted towards the proximal effector face 11. The plurality of through holes 22 traverses through the thin antenna body 21, and each of the plurality of gripping pads 4 is positioned through a corresponding hole from the plurality of through holes 22, which allows a semiconductive wafer 10 to be frictionally gripped by the plurality of gripping pads 4 while allowing the electrostatic antenna 2 to electrostatically attract the semiconductive wafer 10 towards the flat effector body 1 without coming into physical contact with the thin antenna body 21. Each of the plurality of through holes 22 is perimetrically positioned around a corresponding pad from the plurality of gripping pads 4 so that the thin antenna body 21 is able to span across as much of the proximal effector face 11 as possible. The antenna controller 3 is also mounted onto the distal effector face 12 in order to prevent any mechanical interference as a semiconductive wafer 10 is frictionally gripped by the plurality of gripping pads 4 on the other side of the flat effector body 1. Alternatively, the antenna controller 3 can be mounted anywhere else on the flat effector body 1 that does not affect the operation of the current invention. The antenna controller 3 is electronically connected to the thin antenna body 21 so that the antenna controller 3 is able to activate and deactivate the non-uniform electrostatic field being generated by the thin antenna body 21 and is able to increase and decrease the strength of the non-uniform electrostatic field.

As can be seen in FIGS. 1-3, the present invention needs to be able to frictionally grip a semiconductive wafer yet position the semiconductive wafer offset from the electrostatic antenna 2. Thus, each of the plurality of gripping pads 4 may comprise a fixed pad end 41 and a free pad end 42, which are opposing ends of a gripping pad. The fixed pad end 41 is connected onto the proximal effector face 11, while the free pad end 42 is positioned offset from the proximal effector face 11. In addition, the thin antenna body 21 may comprise a fixed antenna surface 211 and a free antenna surface 212, which are opposing surfaces of the thin antenna body 21. The fixed antenna surface 211 is connected across the proximal effector face 11, while the free antenna surface 212 is positioned offset from the proximal effector face 11. Moreover, the free pad end 42 is positioned offset from the free antenna surface 212 by a clearance gap 5, and the free antenna surface 212 being positioned in between the proximal effector face 11 and the free pad end 42. This arrangement to create the clearance gap 5 prevents the electrostatic antenna 2 and the plurality of gripping pads 4 from functionally interfering with each other so that the electrostatic antenna 2 is only able to apply an attractive electrostatic field across a semiconductive wafer 10 without coming into physical contact with the semiconductive wafer 10, while each of the plurality of gripping pads 4 is only able to apply a static frictional force onto the semiconductive wafer 10.

As can be seen in FIGS. 1 and 2, the shape of the flat effector body 1 allows the present invention to better arrange the plurality of gripping pads 4 for a semiconductive wafer. Thus, the flat effector body 1 may further comprise a first body branch 13, a second body branch 14, and a body stem 15, which are arranged into a Y-shaped configuration. The body stem 15 forks into the first body branch 13 and the second body branch 14 in order to create the Y-shaped configuration for the flat effector body 1. In addition, the plurality of gripping pads 4 may comprise a first gripping pad 43, a second gripping pad 44, a third gripping pad 45, and a fourth gripping pad 46, which are positioned on different portions of the flat effector body 1 allowing the present invention to frictionally grip different portions of a semiconductive wafer 10. Moreover, the first gripping pad 43 is mounted onto the first body branch 13, offset from the body stem 15, and the second gripping pad 44 is mounted onto the second body branch 14, offset from the body stem 15, which allows the first gripping pad 43 and the second gripping pad 44 to frictionally grip some peripheral portions of a semiconductive wafer 10. The third gripping pad 45 and the fourth gripping pad 46 are also mounted onto the body stem 15, which allows the third gripping pad 45 and the fourth gripping pad 46 to frictional grip some other portions of a semiconductive wafer 10 that are offset from the first gripping pad 43 and the second gripping pad 44.

Figure 5:
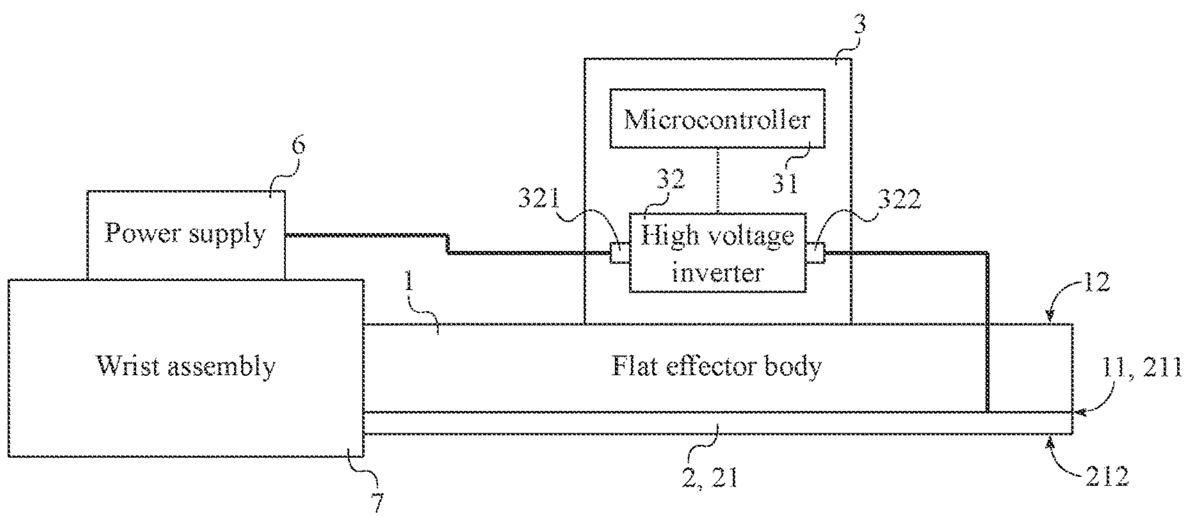
FIG. 5 is a block diagram illustrating the electrical and electronic connections between components of the present invention.

As can be seen in FIGS. 3 and 5, the antenna controller 3 allows the present invention to control the activation/deactivation and the strength of a non-uniform electrostatic field generated by the thin antenna body 21. Thus, the antenna controller 3 may comprise a microcontroller 31 and a high voltage inverter 32. The microcontroller 31 is used to receive and process digital information and is used to manage and output digital instructions. The high voltage inverter 32 is used to convert a high voltage direct current (DC) into an alternating current (AC) and is then used to multiply and rectify the AC into a pulsed DC, which can then be used to generate the non-uniform electrostatic field with the thin antenna body 21. Thus, the high voltage inverter 32 may comprise a high voltage DC power input 321 and a pulsed DC power output 322. The high voltage DC power input 321 allows the high voltage inverter 32 to physically receive a high voltage DC from a DC power source. After the high voltage inverter 32 converts a high voltage DC into a pulsed DC, the pulsed DC power output 322 allows the high voltage inverter 32 to physically output the pulsed DC, and, consequently, the pulsed DC power output 322 is electronically connected to the electrostatic antenna 2 so that the pulsed DC is able to power the non-uniform electrostatic field generated by the thin antenna body 21. In addition, before the high voltage inverter 32 outputs a pulsed DC, the microcontroller 31 is electronically connected to the high voltage inverter 32 in order to modulate the conversion of a high voltage DC into the pulsed DC. Moreover, the use of a pulsed DC to power the electrostatic antenna 2 allows the electrostatic antenna 2 to preferably be a radio frequency (RF) biased electrode. The use of a pulsed DC to power the electrostatic antenna 2 also allows the microcontroller 31 to preferably be configured to control a duty cycle of an RF signal being sent from the pulsed DC power output 322 to the electrostatic antenna 2. More specifically, the microcontroller 31 is preferably configured to control the duty cycle of the RF signal by pulse-width modulating the RF signal.

As can be seen in FIGS. 3 and 5, the present invention needs to be able to readily power the electrostatic antenna 2 and needs to be able to readily move the flat effector body 1. Thus, the present invention may further comprise a power supply 6 and a wrist assembly 7. The power supply 6 is used to provide a high voltage DC that is readily available to the high voltage inverter 32 and the electrostatic antenna 2, and, consequently, the power supply 6 is electrically connected to the DC power input 321, which allows the power source to readily deliver a high voltage DC to the high voltage inverter 32. The wrist assembly 7 is a mechanism that readily moves the flat effector body 1 to properly handle a semiconductive wafer 10, and, consequently, the flat effector body 1 is operatively coupled to the wrist assembly 7, wherein the wrist assembly 7 is used to move the flat effector body 1. In addition, the power supply 6 is mounted onto the wrist assembly 7 so that the power supply 6 does not weigh down the flat effector body 1 as the flat effector moves to handle a semiconductive wafer 10.

Figure 4:
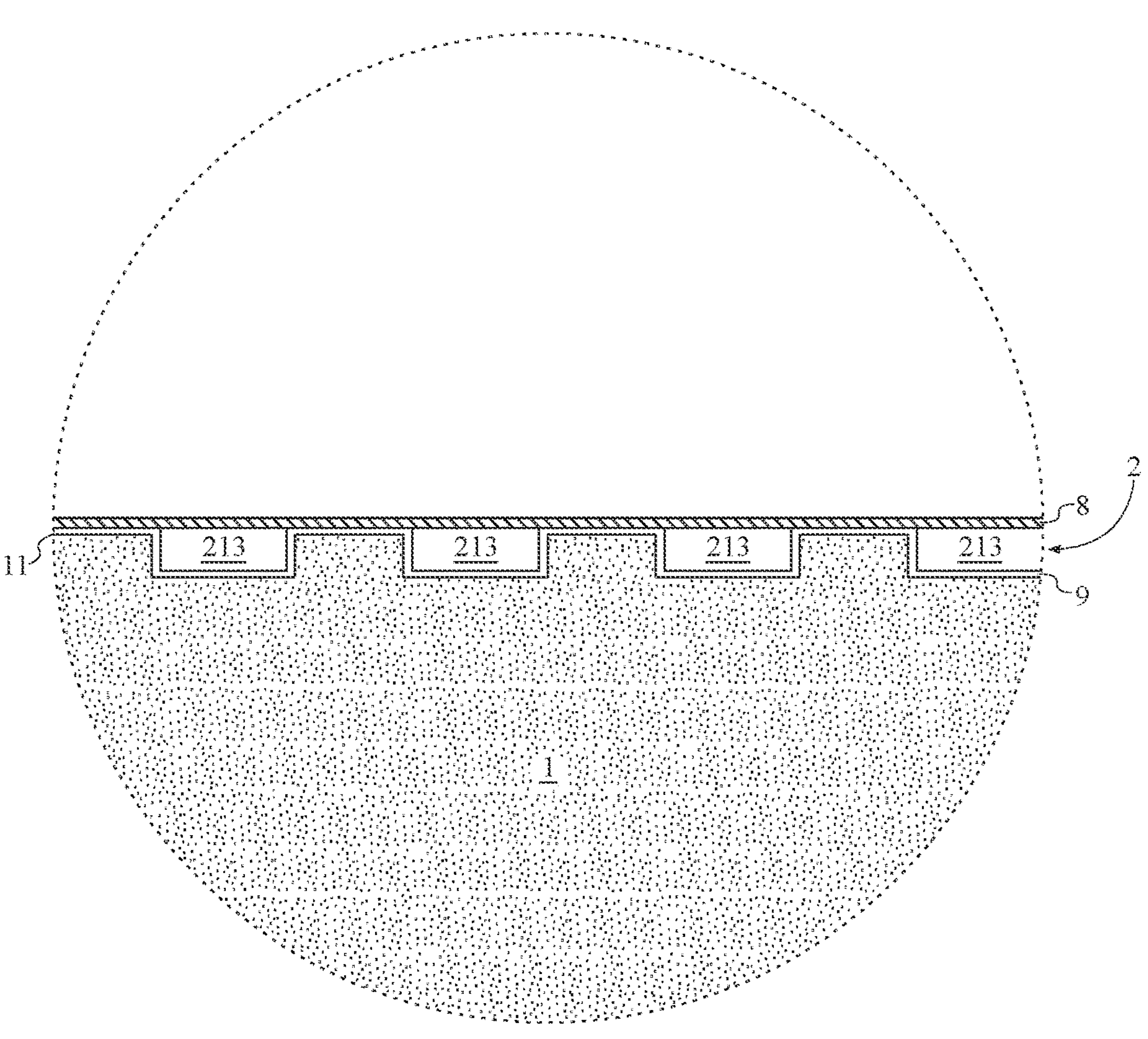
FIG. 4 is a schematic detail view taken about circle 4 in FIG. 3.

As can be seen in FIGS. 3 and 4, the thin antenna body 21 needs to be able to physically generate the non-uniform electrostatic field in order to apply an attractive force onto a semiconductive wafer. Thus, the thin antenna body 21 may comprise a plurality of conductive poles 213, which are antennas that maintain opposing electrical charges amongst each other in order to generate an electrical field between those opposing electrical charges. These antennas are designed to be highly resistive so that each antenna is able to hold a larger charge and, consequently, is able to increase the capacitance amongst each other. As a result, the plurality of conductive poles 213 is configured to generate an attractive electrostatic field and allows the thin antenna body 21 to bond a semiconductive wafer 10 to the flat effector body 1. In addition, each of the plurality of conductive poles 213 is embedded into the flat effector body 1 from the proximal effector face 11 so that the plurality of conductive poles 213 is securely held offset from a semiconductive wafer 10 that is physically resting against the plurality of gripping pads 4. The antenna controller 3 is electronically connected to each of the plurality of conductive poles 213 so that a pulsed DC received by each of the plurality of conductive poles 213 has been modulated by the microcontroller 31.

As can be seen in FIGS. 3 and 4, the present invention needs to be able to further bond a semiconductive wafer to the flat effector body 1 instead of exclusively relying on the plurality of conductive poles 213. Thus, the present invention may further comprise a dielectric thin film 8. The dielectric thin film 8 is used to adjust the relative permittivity between a semiconductive wafer 10 and the flat effector end in order to optimize a bonding force between the semiconductive wafer 10 and the electrostatic antenna 2. The dielectric thin film 8 is superimposed onto the proximal effector face 11, which allows the dielectric thin film 8 to be a capstone layer for the electrostatic antenna 2 and the flat effector body 1. The dielectric thin film 8 is preferably made of a highly insulative material [e.g., polyimide, polytetrafluoroethylene (PTFE), polyethylene terephthalate (PET), ceramic, glass, etc.]. The highly insulative material can preferably be deposited onto the proximal effector face 11 through a coating method. However, the highly insulative material can alternatively be deposited onto the proximal effector face 11 through a plasma-spray delivery method, a vapor-phase-evaporation delivery method, a chemical-vapor-deposition delivery method, or other kinds of delivery methods.

The dielectric thin film 8 is preferably configured to tune the attractive electrostatic field generated by the plurality of conductive poles 213. Tuning for an increase in capacitance amongst the plurality of conductive poles 213 allows for a stronger bonding force between a semiconductive wafer 10 and the electrostatic antenna 2. In other words, the dielectric thin film 8 tunes the electrostatic field emanating amongst the plurality of conductive poles 213 in accordance to Coulomb's law. In addition, a thickness of the dielectric thin film 8 can be configured to proportionately tune the capacitance amongst the plurality of conductive poles 213. This is because the relative permittivity between a semiconductive wafer 10 and the electrostatic antenna 2 increases/decreases with the thickness of the dielectric thin film 8, and the capacitance amongst the plurality of conductive poles 213 increases/decreases with the relative permittivity between a semiconductive wafer 10 and the electrostatic antenna 2.

As can be seen in FIGS. 3 and 4, a gap size between each adjacent pole pair from the plurality of conductive poles 213 is determined by two factors: the size of semiconductive wafers being held by the present invention and the operational voltage range of the present invention. The size of the semiconductive wafers determines the gap size because the present invention can grasp a smaller semiconductive wafer with a smaller gap size between each adjacent pole pair. However, a smaller gap size would more likely cause a corona discharge between each adjacent pole pair. The operational voltage of the present invention also determines the gap size because the present invention can more securely grasp a semiconductive wafer with a higher operational voltage. However, a higher operational voltage would more likely cause a corona discharge between each adjacent pole pair. The present invention should be designed to adequately grasp the semiconductive wafers without causing a corona discharge by selecting the appropriate gap size and by selecting the appropriate operational voltage for the present invention. Thus, the appropriate gap size and the appropriate operational voltage are also chosen to accommodate a specific size or kind of semiconductive wafer. In addition, an insulative film 9 is positioned between each of the plurality of conductive poles 213 and the flat effector body 1, which prevents an electrical current from passing through an intermediate portion of the flat effector body 1 between each adjacent pole pair. The flat effector body 1 can be made of silicon or aluminum, which is oxidized on its external surface in order to form the insulative film 9.

Although the invention has been explained in relation to its preferred embodiment, it is to be understood that many other possible modifications and variations can be made without departing from the spirit and scope of the invention as hereinafter claimed.

What is claimed is:

1. An electrostatically-enhanced friction-gripping end effector comprising:
- a flat effector body;
- an electrostatic antenna;
- an antenna controller;
- a plurality of gripping pads;
- the flat effector body comprising a proximal effector face and a distal effector face;
- the electrostatic antenna comprising a thin antenna body and a plurality of through holes;
- the plurality of gripping pads being distributed across the flat effector body;
- the plurality of gripping pads being mounted onto the proximal effector face;
- the plurality of through holes traversing through the thin antenna body;
- the thin antenna body being superimposed onto the proximal effector face;
- each of the plurality of gripping pads being positioned through a corresponding hole from the plurality of through holes;
- each of the plurality of through holes being perimetrically positioned around a corresponding pad from the plurality of gripping pads;
- the antenna controller being mounted onto the distal effector face; and
- the antenna controller being electronically connected to the thin antenna body.

2. The electrostatically-enhanced friction-gripping end effector as claimed in claim 1 comprising:
- each of the plurality of gripping pads comprising a fixed pad end and a free pad end;
- the thin antenna body comprising a fixed antenna surface and a free antenna surface;
- the fixed pad end being connected onto the proximal effector face;
- the free pad end being positioned offset from the proximal effector face;
- the fixed antenna surface being connected across the proximal effector face;
- the free antenna surface being positioned offset from the proximal effector face;

the free pad end being positioned offset from the free antenna surface by a clearance gap; and the free antenna surface being positioned in between the proximal effector face and the free pad end.

3. The electrostatically-enhanced friction-gripping end effector as claimed in claim 1 comprising:

the flat effector body further comprising a first body branch, a second body branch, and a body stem;

the plurality of gripping pads comprising a first gripping pad, a second gripping pad, a third gripping pad, and a fourth gripping pad;

the first body branch, the second body branch, and the body stem being arranged into a Y-shaped configuration;

the first gripping pad being mounted onto the first body branch, offset from the body stem;

the second gripping pad being mounted onto the second body branch, offset from the body stem; and the third gripping pad and the fourth gripping pad being mounted onto the body stem.

4. The electrostatically-enhanced friction-gripping end effector as claimed in claim 1 comprising:

the antenna controller comprising a microcontroller and a high voltage inverter;

the high voltage inverter comprising a high voltage direct current (DC) power input and a pulsed DC power output;

the microcontroller being electronically connected to the high voltage inverter; and the pulsed DC power output being electronically connected to the electrostatic antenna.

5. The electrostatically-enhanced friction-gripping end effector as claimed in claim 4 comprising:

a power supply;

a wrist assembly;

the flat effector body being operatively coupled to the wrist assembly, wherein the wrist assembly is used to move the flat effector body;

the power supply being mounted onto the wrist assembly; and the power supply being electrically connected to the high voltage DC power input.

6. The electrostatically-enhanced friction-gripping end effector as claimed in claim 4, wherein the electrostatic antenna is a radio frequency (RF) biased electrode.

7. The electrostatically-enhanced friction-gripping end effector as claimed in claim 4, wherein the microcontroller is configured to control a duty cycle of an RF signal being sent from the pulsed DC power output to the electrostatic antenna.

8. The electrostatically-enhanced friction-gripping end effector as claimed in claim 7, wherein the microcontroller is configured to control the duty cycle of the RF signal by pulse-width modulating the RF signal.

9. The electrostatically-enhanced friction-gripping end effector as claimed in claim 1, wherein each of the plurality of gripping pads is made of a conductive elastomer.

10. The electrostatically-enhanced friction-gripping end effector as claimed in claim 1, wherein each of the plurality of gripping pads is made of a material safe from electrostatic discharge.

11. The electrostatically-enhanced friction-gripping end effector as claimed in claim 1, wherein the flat effector body is at ground potential.

12. The electrostatically-enhanced friction-gripping end effector as claimed in claim 1, wherein each of the plurality of gripping pads is at ground potential.

13. The electrostatically-enhanced friction-gripping end effector as claimed in claim 1 comprising:

the thin antenna body further comprising a plurality of conductive poles;

the plurality of conductive poles being configured to generate an attractive electrostatic field;

each of the plurality of conductive poles being embedded into the flat effector body from the proximal effector face; and the antenna controller being electronically connected to each of the plurality of conductive poles.

14. The electrostatically-enhanced friction-gripping end effector as claimed in claim 13 comprising:

a dielectric thin film; and the dielectric thin film being superimposed onto the proximal effector face.

15. The electrostatically-enhanced friction-gripping end effector as claimed in claim 13, wherein the dielectric thin film is configured to tune the attractive electrostatic field.

16. The electrostatically-enhanced friction-gripping end effector as claimed in claim 13 comprising:

an insulative film; and the insulative film being positioned between each of the plurality of conductive poles and the flat effector body.

* * * * *